United States Patent [19]

McLaughlin et al.

[11] Patent Number: 4,864,144

[45] Date of Patent: Sep. 5, 1989

[54] COLOR-MATCHED, AMBIENT-LIGHT VISUAL COMPARATOR DOSIMETER

[76] Inventors: William L. McLaughlin, 3901 Albemarle St., N.W., Washington, D.C. 20016; Mohamed I. Al-Sheikhly, P.O. Box 3061, Gaithersburg, Md. 20877; Walter J. Chappas, 900 Hurley Ave., Rockville, Md. 20850; Mahnaz Farahani, 907 Clopper Rd., Apt. A-4, Gaithersburg, Md. 20878

[21] Appl. No.: 236,248

[22] Filed: Aug. 25, 1988

[51] Int. Cl.$^4$ .............................................. G01T 1/02
[52] U.S. Cl. ............................. 250/474.1; 250/472.1
[58] Field of Search ............ 250/474.1, 472.1, 252.1 A

[56] References Cited

U.S. PATENT DOCUMENTS

| | | | |
|---|---|---|---|
| 2,689,308 | 9/1954 | Land | 250/474.1 |
| 2,736,934 | 3/1954 | Friedman | 250/474.1 |
| 2,757,292 | 7/1956 | Schulman et al. | 250/474.1 |
| 2,763,786 | 9/1956 | Mauer et al. | 250/474.1 |
| 2,972,051 | 2/1961 | Baum | 250/474.1 |
| 4,377,751 | 3/1983 | Kronenberg et al. | 250/474.1 |
| 4,488,046 | 12/1984 | Bernstein | 250/474.1 |
| 4,489,240 | 12/1984 | Kronenberg et al. | 250/474.1 |
| 4,788,126 | 11/1988 | Feldman et al. | 250/474.1 |

OTHER PUBLICATIONS

*DL-M4 Dosimeter*, description dated 04-22-87.

*Primary Examiner*—Carolyn E. Fields
*Attorney, Agent, or Firm*—Bernard, Rothwell & Brown

[57] ABSTRACT

A radiation dosimeter includes an optical waveguide enclosing a radiation-sensitive material that changes color or color intensity with increasing amounts of exposure to high energy ionizing radiation. A light-transparent radiation-transparent light-transmitting member extends along the length of the optical waveguide, and is separated from the radiation-sensitive material by a light-opaque sidewall. Outside the light-transmitting member is a light-opaque shield that permits light to enter distal ends of the waveguide and the light-transmitting member, while permitting light to exit the proximal ends thereof, the light-opaque shield being transparent to high energy ionizing radiation. A light transmission comparator is positioned adjacent the proximal end of the light-transmitting member, the comparator including a plurality of transparent segments of different color or color intensity arranged in an array of consecutive light-to-dark shades, the color or color intensity of each segment being an exact reproduction of an actual dose level coloration that results from exposure of the radiation-sensitive material within the waveguide of a particular dose of radiation, so as to provide for accurate determination of radiation exposure to the optical waveguide under a variety of ambient lighting conditions.

14 Claims, 1 Drawing Sheet

U.S. Patent  Sep. 5, 1989  4,864,144
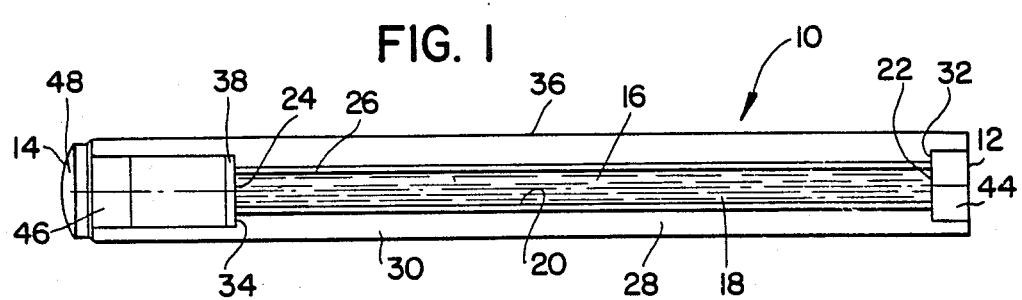
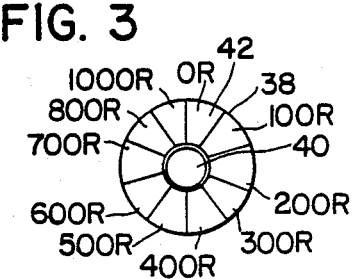
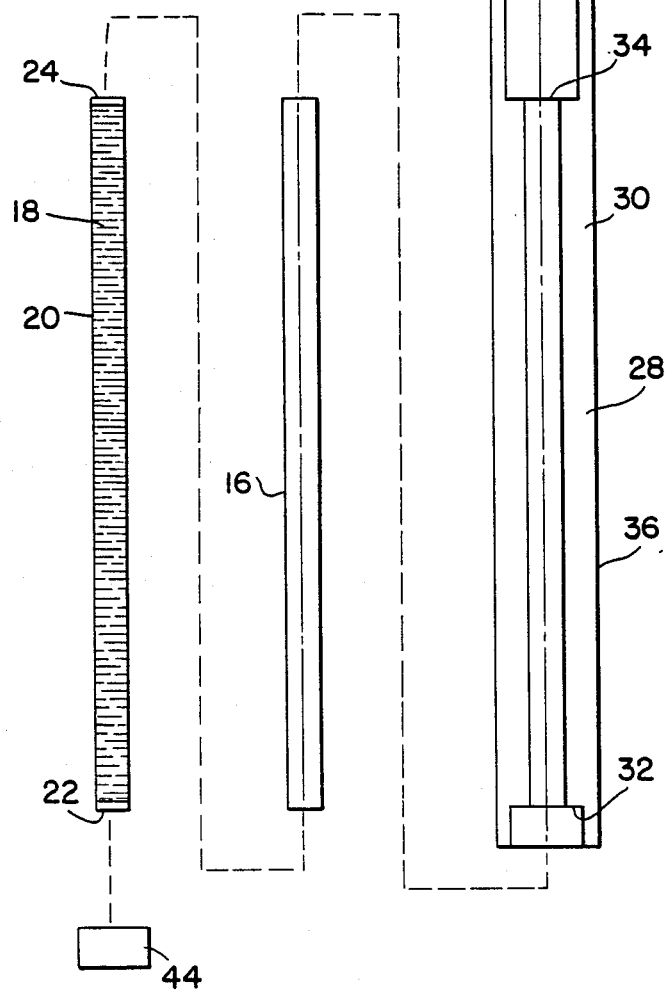

COLOR-MATCHED, AMBIENT-LIGHT VISUAL COMPARATOR DOSIMETER

BACKGROUND OF THE INVENTION

Field of the Invention

The present invention relates to a personal dosimeter for measuring absorbed radiation doses

DESCRIPTION OF THE BACKGROUND ART

Radiation dosimetry is the measurement of the amount of radioactive energy deposited in or absorbed by a material. While it is very difficult to measure the amount of radioactive energy deposited in a material directly, in many materials, it is possible to measure the result of this energy deposition in the form of chemical or physical changes, such as tensile, photographic, light emission, and color.

In the radiation processing art, it is common to use UV-visible spectrophotometers to very accurately measure the increasing or decreasing color of a dosimeter. The change of color then is compared to a calibration chart and the radiation dose is calculated. While these dose measuring devices are quite accurate, they are also very expensive.

A number of radiation intensity measuring and detecting devices have been proposed which employ materials that change color upon exposure to radiation. For example, U.S. Pat. No. 2,689,308 to Land discloses a somewhat complex radiation detecting device that employs a split field polarizing element in conjunction with a full field polarizing element mounted in a rotatable eye piece that is utilized to determine the amount of radiation to which the device is exposed.

U.S. Pat. No. 2,673,934 to Friedman discloses a radiation intensity measuring device including a radiation sensitive element which registers the intensity of the received radiation in terms of the depth of induced color. At one end of the radiation sensitive element is a dyed plastic color chart that is graded in depth of the corresponding induced color in terms of roentgen units.

U.S. Pat. No. 2,757,292 to Schulman et al. also discloses a radiation sensitive dosimeter that utilizes a printed color chart to determine radiation exposure.

U.S. Pat. No. 2,763,786 to Mauer et al. discloses a crystal-type dosimeter that changes color and utilizes patches of blue-colored paper at a viewing end thereof that represent different degrees of irradiation.

Other radiation measuring devices are shown in U.S. Pat. Nos. 4,377,751; 4,489,240 and 4,488,046.

A pocket radiation dosimeter is disclosed in U.S. Pat. No. 2,972,051 to Baum, that utilizes a radiation sensitive glass fiber bundle that is circularly wound about a mandrel. A plurality of glass rods having various light transmission efficiencies are used as standards with which to compare the light transmission through the radiation sensitive glass fiber bundle when a radioactive dosage readout is desired.

A problem associated with prior art radiation dosimeter devices is the inability to accurately determine radiation dosage levels under a variety of lighting conditions. This is due to apparent color changes between the radiation sensitive member and the comparator standard under varying light conditions due to light spectral distribution, light shade or brightness. There thus remains a need in the art for an inexpensive personal dosimeter that permits the user to visually distinguish shades of color formed by different radiation doses and accurately compare those shades with a comparator standard under any ambient light conditions.

SUMMARY OF THE INVENTION

In accordance with the present invention, a radiation dosimeter having a light-receiving end and a light-exiting end includes an elongate, transparent, optical waveguide comprised of a radiation-sensitive material that changes color or color intensity with increasing amounts of exposure to high energy ionizing radiation. The waveguide has a light-transparent distal end at the light-receiving and of the dosimeter, a light-transparent proximal end at the light-exiting end of the dosimeter, and a light-opaque sidewall portion surrounding the radiation-sensitive material from the distal end to the proximal end of the waveguide. The sidewall prevents light from impinging on the radiation-sensitive material except through the distal and proximal ends of the waveguide, and is transparent to high energy ionizing radiation. The waveguide permits light transmission from the distal end to the proximal end thereof through the radiation-sensitive material. A light-transparent and radiation-transparent, light-transmitting member extends along the length of the optical waveguide adjacent to and outside the sidewall portion of the waveguide. The light-transmitting member has a body portion, a distal end adjacent the light-receiving end of the dosimeter and a proximal end adjacent the light-exiting end of the dosimeter. The light-transmitting member permits light transmission from the distal end to the proximal end thereof through the body portion of the light transmitting member. A light-opaque shield is provided outside the light-transmitting member that prevents light from impinging on the body portion of the light-transmitting member while permitting light to enter the distal ends of both the waveguide and the light-transmitting member. The light-opaque shield permits light to exit the proximal ends of both the waveguide and the light-transmitting member, and is transparent to high energy ionizing radiation. A light transmission comparator is positioned adjacent the proximal end of the light-transmitting member for receiving light exiting the proximal end of the light-transmitting member for comparison with light exiting the proximal end of the waveguide. The comparator is comprised of a plurality of transparent segments of different color or color intensity arranged in an array of consecutive light-to-dark shades, the color or color intensity of each segment being an exact reproduction of an actual dose level coloration that results from exposure of the radiation-sensitive material of the waveguide to a particular dose of radiation. The comparator provides for an accurate determination of radiation exposure to the optical waveguide under a variety of ambient lighting conditions by exposing the light-receiving end of the dosimeter to ambient light and comparing the color or color intensity of light passing through the differently colored segments from the proximal end of the light-transmitting member, to light exiting the proximal end of the waveguide, so that an accurate determination can be made of the amount of radiation exposure to the waveguide.

BRIEF DESCRIPTION OF THE DRAWINGS

FIG. 1, is a partly schematic cross-sectional view showing a personal dosimeter in accordance with the present invention.

FIG. 2, is a partly schematic exploded view of the personal dosimeter shown in FIG. 1.

FIG. 3, is an enlarged elevation view, partly schematic, of a color wheel comparator utilized in a personal dosimeter according to the present invention.

DETAILED DESCRIPTION OF THE PREFERRED EMBODIMENT

FIG. 1 illustrates an assembled radiation dosimeter 10 according to the present invention having a light-receiving end 12 and a light-exiting end 14. Within dosimeter 10 is a cylindrical, elongate, optical waveguide 16 enclosing a radiation-sensitive material 18 that changes color or color intensity with increasing amounts of exposure to high energy ionizing radiation, such as X-rays, gamma-rays, beta-rays or fast neutrons.

With reference to FIG. 2, waveguide 16 can include a plastic tubing 20 that is filled with a solution of the radiation-sensitive material 18. The solution of radiation-sensitive material is enclosed within transparent tubing 20 by a light-transparent distal end 22 that, in the assembled state shown in FIG. 1, is positioned adjacent the light-receiving end 12 of the dosimeter. A light-transparent proximal end 24 encloses the radiation-sensitive material 18 at the opposite end of tubing 20, which is positioned adjacent the light-exiting end 14 of the dosimeter in the assembled state.

The transparent tube ends 22 and 24 may be plugs of any suitable light-transparent material which does not interact with the solution of radiation-sensitive material. Advantageously, the distal and proximal end plugs are somewhat larger in diameter than the diameter of the transparent tubing, so as to provide a good seal.

The transparent plastic tubing 20 should have a refractive index that is lower than the refractive index of the solution of radiation-sensitive material contained therein, so as to satisfy the condition for an optical waveguide. Suitable plastic tubing for use in the invention include, but are not limited to, "FEP" and polytetrafluoroethylene.

The diameter of the plastic tubing 20 is not critical, and can, for example, be within the range of from about 0.5–4.0 mm.

In particularly preferred embodiments, the radiation-sensitive material is a leuko dye. Leuko dyes are normally colorless dyes which change color or color intensity when exposed to ionizing radiation. Examples of suitable radiochromic leuko dyes include cyanides of hexahydroxyethyl pararosaniline, pararosaniline, crystal violet, setoglaucine, and erioglaucine. Stability of the radiation sensitive material is increased by increasing the dielectric constant of the solvent using suitable polar solvents and sufficient concentration of acetic acid. A change in color of a leuko dye is usually permanent. This permanency can be bolstered by the presence of dissolved oxygen and by adding about 1% of glacial acetic acid to the solution of dye.

The solvent for the leuko dye should be a polar organic solvent such as dimethylsulfoxide, triethylphosphate or N,N-dimethylformamide.

The sensitivity of the dosimeter depends primarily on the length of the optical waveguide and on the concentration of the leuko dye solution. Consequently, for a given length of plastic tubing 20, the sensitivity of the dosimeter will be increased by a corresponding increase in the concentration of the leuko dye in solution. Thus, high dye concentrations can be utilized to detect very low doses of radiation exposure. For example, with a concentration of about 15% of a concentrated solution of hexahydroxyethyl pararosaniline cyanide in triethylphosphate, the length of plastic tubing 20 required to cover a radiation dose range of about 0–1000 rads is about 15 cm.

The elongate optical waveguide 16 include light-opaque sidewall portion 26 that surrounds the transparent plastic tubing 20 of the optical waveguide from the distal end 22 to the proximal end 24. Sidewall portion 26 of waveguide 16 prevents light from impinging on the radiation-sensitive material except through the distal and proximal ends 22 and 24 respectively The light-opaque sidewall portion 26 is transparent to high energy ionizing radiation, and can be formed over the transparent plastic tube 20 as a shrink-type tubing, or, for example, can be a black paint that is compatible with plastic tubing 20.

It can be seen that the construction of waveguide 16 permits light entering the distal end 22 to pass through the radiation-sensitive material 18 and out the proximal end 24 of the waveguide.

Disposed about the elongate optical waveguide 16 is a tubular, light-transparent and radiation-transparent light-transmitting member 28 having a body portion 30, a distal end 32 adjacent the light-receiving end 12 of the dosimeter, and a proximal end 34 adjacent the light-exiting end 14 of the dosimeter. The light-transmitting member 28 extends along the length of the optical waveguide 16 adjacent to and surrounding the outside of the light-opaque sidewall portion 26.

The light-transmitting member 28 can be constructed of any suitable light-transparent and radiation-transparent material, e.g., an acrylic such as PMMA. Light is transmitted through the light transmitting member 28 from the distal end 32 to the proximal end 34 through the body portion 30 thereof.

A light-opaque shield 36 covers the outside of the body portion of the light-transmitting member 28 for preventing light from impinging on the body portion 30 of the light-transmitting member, while permitting light to enter the distal ends 32 and 22 respectively of waveguide 16 and light-transmitting member 28. The light-opaque shield 36 further permits light to exit the proximal ends 24 and 34 respectively of waveguide 16 and light-transmitting member 28. The light-opaque shield 36 is transparent to high energy ionizing radiation, thereby permitting irradiation of the radiation-sensitive material 18 within waveguide 16.

According to preferred embodiments, the light-opaque shield 36 is comprised of any suitable black, radiation-transparent, light-opaque paint, although, shield 36 can be a shrink-type tubing applied to the outside of light-transmitting member 28.

The principle feature of the invention resides in a unique light transmission comparator 38 positioned adjacent the proximal end 34 of the light-transmitting member 28.

With reference to FIG. 3, the light transmission comparator of the present invention includes a centrally located, transparent, colorless window 40 Transparent central window 40 is precisely sized and positioned for aligning with the proximal end 24 of the transparent tubing 20 of the optical waveguide 16, such that the transparent central window 40 transmits light exiting the proximal end 24 of waveguide 16.

Disposed about the periphery of the transparent central window 40 is a plurality of transparent segments 42 of different color or color intensity arranged in an array of consecutive light-to-dark shades. Thus, the comparator is a circular color wheel with differently colored segments 42 thereof positioned adjacent each other about the periphery of transparent window 40 and the proximal end 24 of waveguide 16.

The color wheel comparator of the present invention differs significantly from prior art dosimeters that utilize variously colored glasses, papers, printings or the like to try to simulate colors or color intensities corresponding to particularly dose level colorations of the radiation-sensitive material. The color simulation methodologies taught in the prior art do not provide for accurate comparisons with the radiation-sensitive material under a wide variety of ambient lighting conditions.

In contrast with the prior art devices, with the present invention, the color or color intensity of each segment 42 is an exact reproduction of an actual dose level coloration that results from exposure of the radiation-sensitive material 18 within waveguide 16 to a particular dose of radiation. This is achieved by providing a plurality of comparator segment precursors, such as pieces of pure, colorless, plastic film containing the same irradiation-sensitive material, i.e., radiochromic dye, as is used in the dosimeter sensor waveguide. A series of the comparator segment precursors are irradiated with a progression of different predetermined radiation doses so as to obtain a plurality of irradiated segment precursors having different light-to-dark shades corresponding to the actual dose level of radiation exposure to each of the respective segment precursors. The irradiated pieces of plastic film are protected against further irradiation, and are arranged into a precursor color wheel array of consecutively light-to-dark shades when viewed as a transparency, photographed and reduced in size. If desired, the precursor color wheel array can be photographed with an overlaid tinted film (e.g., very pale yellow, green, gray, etc.). By the above, a color photographic image of the array of irradiated segment precursors are formed so as to produce a transparent color wheel comprised of a peripheral array of comparator segments having consecutive light-to-dark shades with the color or color intensity of each segment being an exact reproduction of an actual dose level coloration that results from exposure of the radiation-sensitive material to a particular dose of radiation, with the peripheral array of comparator segments disposed about a central light-transparent region.

For calibration, photographic images of the irradiated segment precursors are matched to a series of standards comprised of the radiation-sensitive material, i.e., dosimeter sensor material is irradiated to a series of standard absorbed doses over a particular range of interest, which covers the transmission from very light to very dark. The color comparator is then numbered or keyed to the shade of the color matching that of each dose level of interest for the sake of the visually-determined color (hue) and shade (darkness) of the sensor material, both comparator and sensor being viewed adjacent to each other as transparencies, that is, with transmitted rather than reflected light.

Because the standards have absorbed different known doses of radiation, labelling respective photographic images with the radiation dose level of the respective standard to which it matches provides a color wheel comparator wherein the precise absorption spectrum over the full visual wavelength scale will appear the same to a person with normal color vision under all ambient lighting conditions, i.e., low- or high- color temperature incandescent illumination, daylight, yellow or white fluorescence lighting, flashlight of different brightnesses, and the like.

In the example shown in FIG. 3, the segments of the color comparator wheel are numbered from 0-1000 rads. In preferred embodiments, the comparator is an actual piece of positive color photographic film having a photographic image of the array of segment precursors so that the color or color intensity of each segment is an exact reproduction of an actual dose level coloration that results from exposure of the radiation-sensitive material utilized to a particular dose of radiation.

Thus, the light transmission color wheel comparator of the present invention provides for an accurate determination of radiation exposure to the optical waveguide under a variety of ambient lighting conditions by exposing the light-receiving end 12 of the dosimeter to ambient light, and comparing the color or color intensity of light passing through the differently colored segments 42 from the proximal end 34 of the light-transmitting member, to light exiting the proximal end 24 of the waveguide, so that an accurate determination can be made of the amount of radiation exposure to the waveguide The invention thus overcomes the problems associated with prior art dosimeters that attempted to simulate the coloration that would result from varying radiation dose levels, which coloration changes under different lighting conditions.

Referring back to FIGS. 1 and 2 for the remaining features of the invention, the dosimeter includes a clear distal end cap 44 covering the distal ends of the waveguide 16 and the light transmitting member 28. The distal end cap 44 can be made of any suitable material, such as a clear plastic (e.g., PMMA). The distal end cap 44 is highly polished for maximum light gathering.

Also provided is a clear, light-exiting end cap 46 that covers comparator 38 with the comparator sandwiched between the light-exiting end cap 46 and the proximal ends 24 and 34 respectively of waveguide 16 and the light-transmitting member 28. The light-exiting end cap 46 includes a lens 48 for visually enlarging the comparator 38 and the proximal end 24 of the waveguide to facilitate color comparison of the comparator and the waveguide.

Since many modifications, variations and changes in detail may be made to the described embodiments, it is intended that all matter in the foregoing description and shown in the accompanying drawings be interpreted as illustrative and not in a limiting sense.

What is claimed is:

1. A radiation dosimeter having a light-receiving end and a light-exiting end, the dosimeter further comprising:
   (a) an elongate optical waveguide enclosing a radiation-sensitive material that changes color or color intensity with increasing amounts of exposure to high energy ionizing radiation, said waveguide being comprised of a light-transparent distal end adjacent the light-receiving end of the dosimeter, a light-transparent proximal end adjacent the light-exiting end of the dosimeter and a light-opaque sidewall portion surrounding the radiation-sensitive material from the distal end to the proximal end of the waveguide, the sidewall portion being transparent to high energy ionizing radiation and preventing light from impinging on the radiation-sensitive material except through said distal and proximal ends, the waveguide permitting light entering the distal end thereof to pass through the radiation-sensitive material and out the proximal end of the waveguide;

(b) a light-transparent and radiation-transparent, light-transmitting member that extends along the length of the optical waveguide adjacent to and outside of the light-opaque sidewall portion thereof, said light-transmitting member having a body portion, a distal end adjacent the light-receiving end of the dosimeter and a proximal end adjacent the light-exiting end of the dosimeter, the light-transmitting member permitting light transmission from the distal end to the proximal end thereof through the body portion of the light-transmitting member;

(c) a light-opaque shield outside the light-transmitting member that prevents light from impinging on the body portion of the light-transmitting member while permitting light to enter the distal ends of both the waveguide and the light-transmitting member, the light-opaque shield permitting light to exit the proximal ends of both the waveguide and the light-transmitting member, said light-opaque shield being transparent to high energy ionizing radiation;

(d) a light transmission comparator positioned adjacent the proximal end of the light-transmitting member, the comparator transmitting light exiting the light-transmitting member adjacent its proximal end for comparison with light exiting the proximal end of the waveguide, said comparator being comprised of a plurality of transparent segments of different color or color intensity arranged in an array of consecutive light-to-dark shades, the color or color intensity of each segment being an exact reproduction of an actual dose level coloration that results from exposure of the radiation-sensitive material within the waveguide to a particular dose of radiation, so as to provide for an accurate determination of radiation exposure to the optical waveguide under a variety of ambient lighting conditions by exposing the light-receiving end of the dosimeter to ambient light, and comparing the color or color intensity of light passing through the differently colored segments from the proximal end of the light-transmitting member, to light exiting the proximal end of the waveguide so that an accurate determination can be made of the amount of radiation exposure to the waveguide.

2. The dosimeter of claim 1 wherein said waveguide is cylindrical, said light-transmitting member is tubular and surrounds the sidewall portion of the waveguide, and said comparator is a circular color wheel with the differently colored segments thereof positioned adjacent each other about the periphery of the proximal end of the waveguide.

3. The dosimeter of claim 2 further including a clear distal end cap covering the distal ends of the waveguide and the light-transmitting member.

4. The dosimeter of claim 2 wherein the comparator has a clear central portion covering the proximl end of the waveguide, the dosimeter further including a clear, light-exiting end cap covering the comparator, with the comparator sandwiched between the light-exiting end cap and the proximal ends of the waveguide and the light-transmitting member, the light-exiting end cap including a lens for visually enlarging the comparator and the proximal end of the waveguide to facilitate color comparison of the comparator and the waveguide 5. The dosimeter of claim 1 wherein said comparator is an actual piece of positive color photographic film having a photographic image of an array of segments having different light-to-dark shades.

6. The dosimeter of claim 2 wherein said comparator is an actual piece of positive color photographic film having a photographic image of an array of segments having different light-to-dark shades.

7. The dosimeter of claim 4 wherein said comparator is an actual piece of positive color photographic film having a photographic image of an array of segments having different light-to-dark shades.

8. A radiation dosimeter having a light-receiving end and a light-exiting end, the dosimeter further comprising:

(a) a cylindrical, elongate optical waveguide enclosing a radiation-sensitive material that changes color or color intensity with increasing amounts of exposure to high energy ionizing radiation, said waveguide being comprised of a light-transparent distal end adjacent the light-receiving end of the dosimeter, a light-transparent proximal end adjacent the light-exiting end of the dosimeter and a light-opaque sidewall portion surrounding the radiation-sensitive material from the distal end to the proximal end of the waveguide, the sidewall portion being transparent to high energy ionizing radiation, the waveguide permitting light entering the distal end thereof to pass through the radiation-sensitive material and out the proximal end of the waveguide;

(b) a tubular, light-transparent, radiation-transparent, light-transmitting member that extends along the length of the optical waveguide adjacent to and surrounding said light-opaque sidewall portion, said light-transmitting member having a body portion, a distal end at the light-receiving end of the dosimeter and a proximal end at the light-exiting end of the dosimeter, the light-transmitting member permitting light transmission from the distal end to the proximal end thereof through the body portion of the light-transmitting member;

(c) a light-opaque shield that covers the outside of the body portion of the light-transmitting member and prevents light from impinging on the body portion of the light-transmitting member while permitting light to enter the distal ends of both the waveguide and the light-transmitting member, the shield permitting light to exit the proximal ends of both the waveguide and the light-transmitting member, said shield being transparent to high energy ionizing radiation;

(d) a light transmission comparator comprising a circular color wheel including a plurality of transparent segments of different color or color intensity arranged in an array of consecutive light-to-dark shades about the periphery of the proximal end of the waveguide, the circular color wheel being positioned over the proximal end of the light-transmitting member for receiving light exiting the proximal end of the light-transmitting member to the exclusion of light exiting the proximal end of the waveguide, the comparator having a clear central portion covering the proximal end of the waveguide through which light exiting the waveguide may pass, the comparator being formed by irradiating a series of comparator segment precursors, which precursors are comprised of the same radiation-sensitive material as the optical waveguide, with a progression of different predetermined radiation doses so as to obtain a plurality of irradiated segment precursors having different light-to-dark shades corresponding to the actual dose level of radiation exposure to each of the respective segment precursors, forming a color photographic image of the irradiated segment precursors so as to produce said color wheel having an array of segments with the color or color intensity of each segment being an exact reproduction of an actual dose level coloration that results from exposure of the radiation-sensitive material of the waveguide to a particular dose of radiation, so as to provide for an accurate determination of radiation exposure to the optical waveguide under a variety of ambient lighting conditions, by exposing the light-receiving end of the dosimeter to ambient light, and comparing the color or color intensity of light passing through the differently colored segments from the proximal end of the light-transmitting member, to light exiting the proximal end of the waveguide so that an accurate determination can be made of the amount of radiation exposure to the waveguide.

9. The dosimeter of claim 8 further including a clear distal end cap covering the distal ends of the waveguide and the light-transmitting member 10. The dosimeter of claim 8 further including a clear, light-exiting end cap covering the comparator, with the comparator sandwiched between the light-exiting end cap and the proximal ends of the waveguide and the light-transmitting member, the light-exiting end cap including a lens for visually enlarging the comparator and the proximal end of the waveguide to facilitate color comparison of the comparator and the waveguide.

11. The dosimeter of claim 8 wherein said comparator is an actual piece of positive color photographic film having a photographic image of an array of said irradiated segment precursors.

12. A method for producing a comparator for a radiation dosimeter, comprising:
   (a) providing a plurality of comparator segment precursors comprised of radiation-sensitive material that changes color or color intensity with increasing amounts of exposure to high energy ionizing radiation;
   (b) irradiating a series of said comparator segment precursors with a progression of different predetermined radiation doses so as to obtain a plurality of irradiated segment precursors having different light-to-dark shades corresponding to the actual dose level of radiation exposure to each of the respective segment precursors; and
   (c) forming a color photographic image of the irradiated segment precursors so as to produce a transparent color wheel comprised of a peripheral array of comparator segments having consecutive light-to-dark shades with the color or color intensity of each segment being an exact reproduction of an actual dose level coloration that results from exposure of said radiation-sensitive material to a particular dose of radiation, the peripheral array of comparator segments being disposed about a central light-transparent region.

13. The method of claim 12 further including the steps of arranging the irradiated segment precursors into a precursor color wheel array which is then photographed and reduced in size to form the comparator color wheel.

14. The method of claim 12 further including the steps of matching photographic images of the irradiated segment precursors to a series of standards comprised of said radiation-sensitive material, which standards have absorbed different known doses of radiation, and then labeling each photographic image with the radiation dose level of the respective standard to which it matches.

* * * * *

UNITED STATES PATENT AND TRADEMARK OFFICE
CERTIFICATE OF CORRECTION

PATENT NO. : 4,864,144

DATED : September 5, 1989

INVENTOR(S) : WILLIAM L. MCLAUGHLIN, ET AL.

It is certified that error appears in the above-identified patent and that said Letters Patent is hereby corrected as shown below:

Front Page, Col. 1, [56], line 6, "2,736,934" should be --2,673,934--.
Col. 1, line 8, after "doses" insert --.--.
Col. 4, line 60, after "40" insert --.--.
Col. 6, line 24, after "guide" insert --.--.
Col. 7, line 62, "proximl" should be --proximal--.
Col. 8, line 2, after "waveguide" insert --.--.
Col. 9, line 30, after "member" insert --.--.

Signed and Sealed this

Second Day of October, 1990

Attest:

HARRY F. MANBECK, JR.

Attesting Officer

Commissioner of Patents and Trademarks